(12) United States Patent
Sahasrabudhe et al.

(10) Patent No.: US 10,025,320 B2
(45) Date of Patent: Jul. 17, 2018

(54) CONTROL SYSTEM FOR RECONFIGURABLE ROTARY WING AIRCRAFT

(75) Inventors: Vineet Sahasrabudhe, Cheshire, CT (US); Aaron L. Greenfield, Shelton, CT (US); Derek Geiger, Wilton, CT (US); James Rigsby, Fort Worth, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1747 days.

(21) Appl. No.: 13/396,769

(22) Filed: Feb. 15, 2012

(65) Prior Publication Data

US 2013/0206899 A1 Aug. 15, 2013

(51) Int. Cl.
*G05D 1/00* (2006.01)
*G05D 1/08* (2006.01)

(52) U.S. Cl.
CPC .................. *G05D 1/0858* (2013.01)

(58) Field of Classification Search
CPC ............ B64C 39/024; B64C 2201/027; B64C 2201/123; B64C 27/08; B64C 2201/108; B64D 47/04; B64D 47/06; F21V 29/677; F21V 29/83; F21W 2107/30; F21Y 2115/10; G05B 19/18
See application file for complete search history.

(56) References Cited

U.S. PATENT DOCUMENTS

| | | | |
|---|---|---|---|
| 5,141,177 A * | 8/1992 | Wright et al. | 244/17.13 |
| 5,213,283 A * | 5/1993 | Gold et al. | 244/17.13 |
| 5,238,203 A * | 8/1993 | Skonieczny et al. | 244/17.13 |
| 5,446,666 A * | 8/1995 | Bauer | 701/4 |
| 6,932,569 B2 | 8/2005 | Torok et al. | |
| 7,328,074 B2 | 2/2008 | Das et al. | |
| 7,908,044 B2 | 3/2011 | Piasecki et al. | |
| 7,949,416 B2 | 5/2011 | Fuller | |
| 2008/0125880 A1* | 5/2008 | Kahn | 700/30 |
| 2009/0143925 A1 | 6/2009 | Lavretsky et al. | |
| 2010/0017048 A1* | 1/2010 | Sahasrabudhe et al. | 701/3 |
| 2010/0305719 A1* | 12/2010 | Pekar et al. | 700/29 |

OTHER PUBLICATIONS

Jerry M. Wohletz, "Retrofit systems for reconfiguration in civil Aviation", MIT, Feb. 2000; http://dspace.mit.edu.handle/1721.1/9264.*

Joosten, et al., "Fault-tolerant control using dynamic inversion and model-predictive control applied to an aerospace benchmark", Proceedings of the 17th World Congress, The International Federation of Automatic Control, Seoul, Korea, Jul. 6-11, 2008, 6 pages.

Cheng, et al., "Model Predictive Control and Dynamic Inversion for Unmanned Aerial Vehicle", 5th IFAC/EURON Symposium on Intelligent Autonomous Vehicles, Instituto Superior Tecnico, Lisboa, Portgual, Jul. 5-7, 2004, 6 pages.

* cited by examiner

*Primary Examiner* — Assres H Woldemaryam

(74) *Attorney, Agent, or Firm* — Cantor Colburn LLP

(57) ABSTRACT

A control system for a rotary wing aircraft having a reconfigurable element. The control system includes a model predictive control module receiving operator commands, objectives and constraints; and a dynamic inversion module receiving an output of the model predictive control module, the dynamic inversion module providing control commands to reconfigure the reconfigurable element of the rotary wing aircraft.

11 Claims, 2 Drawing Sheets

CONTROL SYSTEM FOR RECONFIGURABLE ROTARY WING AIRCRAFT

BACKGROUND

The subject matter disclosed herein relates generally to control systems, and in particular to a control system for a reconfigurable rotary wing aircraft.

Vehicles, such as rotary wing aircraft, typically employ a control system that receives operator commands and interfaces those commands to components of the aircraft. For example, existing rotary wing aircraft may employ a primary flight control system (PFCS) and an automatic flight control system (AFCS) that receive operator commands and control aircraft operation. These control systems also sense vehicle status to provide feedback and improve control of the rotary wing aircraft.

A given control system may have a plurality of goals and a plurality of limits. Limits are inequality constraints on system dynamic variables. An example limit may be to prevent an engine temperature from exceeding a certain temperature in order to prevent meltdown or rapid deterioration. Another might be to prevent a rotor speed from exceeding a certain angular velocity to maintain structural integrity and aircraft control power. An example goal may be to achieve a certain engine thrust level, such as a thrust of 10,000 pounds. While it is desirable to achieve goals, it is necessary to meet limits. A multivariable system may include a number of effectors that can be adjusted to meet system goals and limits. In some cases, a system may be cross-coupled, which means that each effector change may affect goals and limits with varying dynamics. In a cross-coupled system, it is not possible to change a single effector in isolation to affect only a single goal or limit, as a change in one effector may affect a plurality of goals or limits. Calculating effector commands in a cross-coupled multivariable system can therefore be complex and computationally demanding.

Model predictive control (MPC) is a multivariable control theory that explicitly includes limits and, therefore, provides a good match with practical systems. MPC can also be configured to respond in realtime to changes in the system, such as actuator faults. Thus, MPC provides a formal method of control algorithm design for multivariable systems that can decouple responses, as well as physically possible, even as limits are hit and faults occur.

SUMMARY

One embodiment is a control system for a rotary wing aircraft having a reconfigurable element. The control system includes a model predictive control module receiving operator commands, objectives and constraints; and a dynamic inversion module receiving an output of the model predictive control module, the dynamic inversion module providing control commands to reconfigure the reconfigurable element of the rotary wing aircraft.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which.

DETAILED DESCRIPTION

Figure 1:
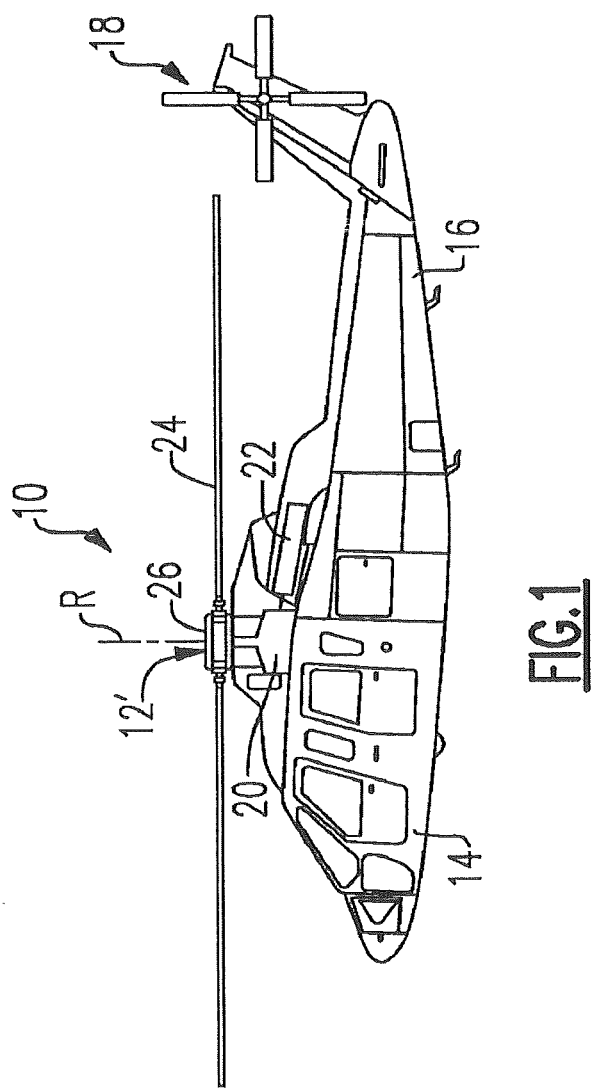
FIG. 1 illustrates and exemplary rotary wing aircraft.

FIG. 1 schematically illustrates a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 is driven about an axis of rotation R through a main gearbox (illustrated schematically at 20) by one or more engines 22. The main rotor assembly 12 includes a multiple of rotor blades 24 mounted to a rotor hub 26. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from embodiments of the invention.

The rotary wing aircraft 10 may include reconfigurable elements. Rotary wing aircraft performance and mission effectiveness can be increased by including reconfigurable or "adaptive" elements which allow the vehicle characteristics to be tailored to specific tasks. These reconfigurable elements include a variety of technologies which can be switched and combined such that certain flying characteristics can be enhanced. The reconfigurable elements, when selectively activated based on mission requirements, may, for example, increase maximum rotor blade 24 lift, suppress characteristics such as vibration and/or noise, increase flight speed, improve hover performance at high gross weights, increase maneuverability, or the like. An on-blade reconfigurable element typically enhances one or two rotor attributes such as low noise, low vibration, efficiency, maneuverability, payload, or speed. The reconfigurable elements can be turned on or off as the mission segment requires. The reconfigurable elements are also designed to work synergistically to maximize rotor capabilities.

Reconfigurable elements also provide an inherent control redundancy. The switching and combining of reconfigurable elements can occur both rapidly (rotor time scale) and slowly (between missions) since changing flight conditions dictate continually changing priorities. Embodiments described herein provide a control system architecture which insures acceptable flying qualities for rotorcraft while simultaneously arbitrating between competing requirements to determine the optimal allocation of control resources. Also, this control system can re-distribute control commands following system failures when redundant control surfaces are available.

The control system is responsible for managing the reconfigurable elements while providing acceptable flying qualities for the vehicle. The reconfigurable element enabling technologies, while enhancing the vehicle capabilities, also greatly expands the operating conditions over which stability and robustness are controlled by the control system. The control system provides several functions which are useful for implementing reconfigurable elements, namely: system stability, robustness, constraint avoidance, technology arbitration, and mission mode switching.

Figure 2:
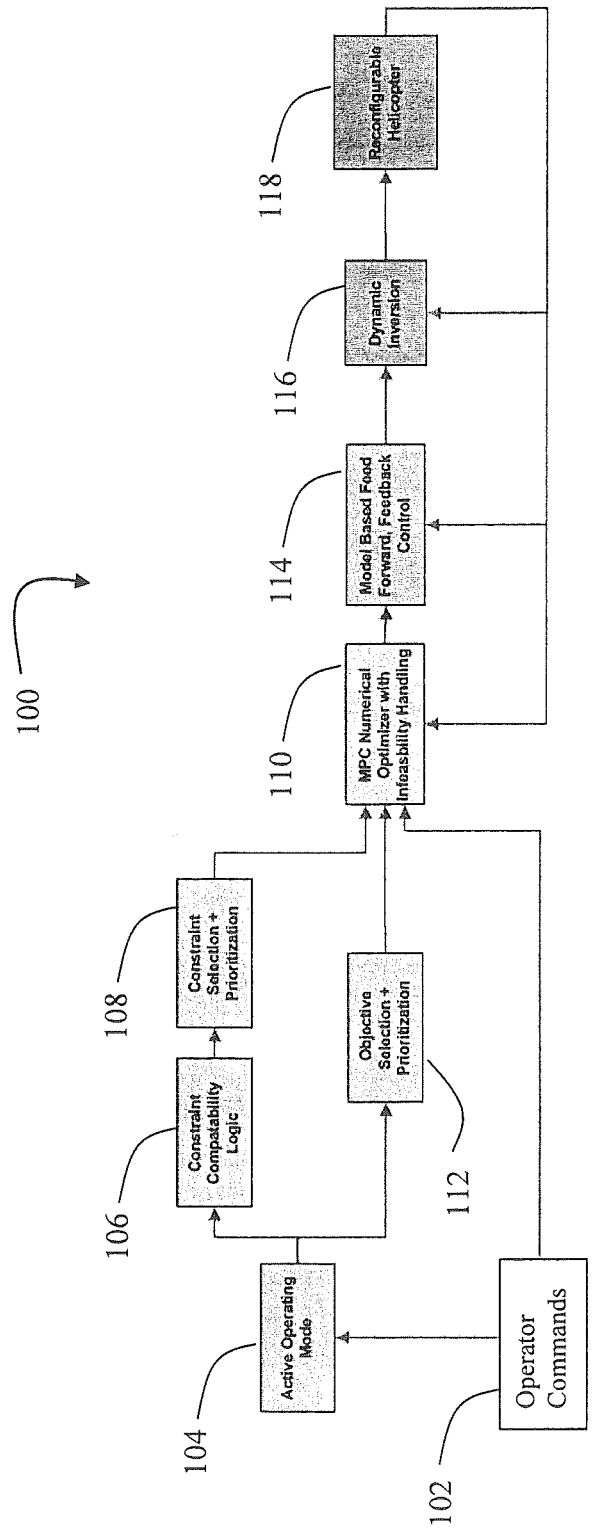
FIG. 2 depicts a control system in an exemplary embodiment.

FIG. 2 depicts a control system 100 in an exemplary embodiment. The control system may be implemented by a microprocessor-based controller executing software code stored in a storage medium to implement the functions described herein. Control system 10 may also be implemented in hardware, or a combination of hardware and software. The control system 100 may be implemented as part of a flight control system present in the rotary wing aircraft 10. It is understood that many of the functions of the flight control system are not shown in FIG. 2 for ease of description of embodiments of the invention.

Operator commands 102 are provided as inputs to the control system 100. Operator commands 102 include commands from a pilot, in a manned aircraft, which may include pilot inceptor inputs, and activation of various buttons and switches. Alternatively, operator commands 102 may come from another control system if the aircraft is unmanned. Operator commands 102 may also include a mode selection for the rotary wing aircraft 10. The aircraft modes relate to the aircraft task, such as attack/scout mode, stealth mode, speed mode, utility mode, cargo mode, etc. The aircraft modes may also include day and night versions for each mode. Further, each aircraft mode may include one or more sub-modes that identify a desired operating characteristic such as controlling vibration, reducing acoustic noise, using minimal power, providing maximum maneuverability, providing damage compensation, etc.

An active operating mode module 104 receives operator commands and determines the desired aircraft operational mode and sub-mode (if any). The active operating mode module 104 may identify the aircraft mode based on a mode/sub-mode selection command from the operator commands 102. Alternatively, the active operating mode module 104 can automatically select a mode/sub-mode based on operator commands, without a mode/sub-mode selection command. For example, if the operator commands include arming weapons systems, the active operating mode module 104 switches the aircraft mode to a combat mode, without requiring an express mode selection.

The aircraft mode determined by active operating mode module 104 is provided to constraint compatibility module 106. Constraint compatibility module 106 determines constraints on aircraft operation in response to the mode/sub-mode from the active operating mode module 104. These constraints associated with the modes/sub-modes are parsed using predetermined compatibility criteria, which make binary selections between competing constraints.

Once the applicable constraints are identified, a constraint selection and prioritization module 108 determines the constraints that will be applied to model predictive control (MPC) module 110. The constraints are assembled in constraint selection and prioritization module 108 as a set of primary, secondary, and global constraints and passed to the MPC module 110. Assembly of the constraints at frequent intervals allows for dynamic reconfiguration with rapidly changing conditions. The constraint selection and prioritization module 108 prioritizes the variety of aircraft constraints in order of importance. In the case of conflicting constraints, constraints are first divided into hard and soft constraints. Hard constraints are critical constraints which cannot be relaxed; only soft-constraints are relaxed. Within the category of soft constraints, each constraint is assigned a priority which determines the amount by which the soft constraint is relaxed relative to other constraints.

Objective selection module 112 translates the operator commands into predetermined objectives and prioritizes the objectives in order of importance. Objectives are prioritized in module 112 using finite-state logic and variable weightings (fixed and adaptive) based on operator commands, current flight conditions, and predetermined precedence criteria. The mode/sub-mode selections are mapped to scheduled models in objective selection module 112, and all models are assembled and passed to the MPC module 110.

Through the constraint selection module 106 and objective selection module 112, control system 100 supports the translation of operator commands including mission mode, as well as sub-modes, into a set of objectives and constraints for the MPC module 110 which best preserve handling qualities and aircraft safety. As noted above, the operator commands may select modes and sub-modes. These modes are converted to objective functions and constraints which capture the best handling tradeoffs for the mode/sub-mode.

MPC module 110 receives the operator commands 102, constraints from constraint selection module 106 and objectives from objective selection module 112, to predict aircraft response. MPC module 110 employs model-based feed forward and feedback control, as shown at 114. MPC module 110 uses feed-forward command shaping and tailors the commands to avoid the applicable system constraints. MPC module 110 accomplishes this function by continuously solving an optimization problem so that the operator commands 102 are followed as closely as possible without violating the system constraints.

Dynamic inversion module 116 generates control commands for the reconfigurable aircraft 118. This includes reconfigurable elements (e.g., mission adaptive rotor elements) and other components (e.g., swashplate). The dynamic inversion module 116 provides control allocation when redundant effectors are present and allows for adaptation of the control allocation in the event of failure. The dynamic inversion module 116 also provides the feedback stabilization over a wide range of operating conditions. The dynamic inversion module 116 is used to maintain stability properties in accordance with expected changes in aircraft configuration. The dynamic inversion module 116 focuses on capturing and canceling the dominant aircraft dynamics with low order aircraft models, but also has the flexibility to target specific higher-order modes for inversion. These include, for example, variable rotor modes which change with varying rotor speed configurations.

The hybrid, adaptive flight control system 100, composed of both dynamic inversion and model predictive control strategies, has advantages over existing model-following, dynamic inversion, and model predictive control strategies. This hybrid control system 100 combines the benefits of each of the architectures while compensating for their weaknesses. Control system 100 takes advantage of model-predictive control's capability of integrating system constraints into the control algorithm providing the benefit of anticipation of, and compensation for, system constraints. Control system 100 also has the ability to dynamically change objectives and constraints in real time. Control system 100 does not suffer from the disadvantages of pure MPC architectures, such as stability guarantees and computation overhead requirements. The ability to dynamically change constraints and generate a control command to avoid this constraint is an inherent weakness of both model following and dynamic inversion, when used individually.

Control system 100 also takes advantage of dynamic inversion's partition of an inner loop designed for stability and robustness, and an outer loop designed for handling qualities. Also, control system 100 has consistent plant dynamics for all flight conditions eliminating the need for controller gain scheduling, which is a weakness of model-following control architectures. Another benefit of control system 100, derived from the dynamic inversion module 116, is the plant dynamics are reduced to an integrator which has ideal gain and phase margins. This is an advantage over both pure model-following and MPC architectures.

By combining the benefits of MPC module 110 and dynamic inversion module 116, and compensating their weakness, hybrid control system 100 can arbitrate between competing objectives to enhance vehicle capabilities and avoid system constraints, while maintaining stability. Control system 100 is beneficial for rotorcraft utilizing mission adaptive rotors and redundant control surfaces, or for rotorcraft which undergo significant aircraft state changes either due to physical configuration changes or aerodynamic effects. Additionally, the MPC module 110 is used in parallel with a backup command model in case of unexpected solver infeasibility.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A control system for a rotary wing aircraft having a reconfigurable element, the control system comprising:
   an active operating mode module receiving operator commands and selecting an aircraft mode in response to the operator commands;
   a model predictive control module receiving operator commands, objectives and constraints, and outputting limited operator commands, wherein the output of the model predictive control module is dependent upon the aircraft mode;
   a dynamic inversion module receiving the limited operator commands of the model predictive control module, the dynamic inversion module providing control commands to reconfigure the reconfigurable element of the rotary wing aircraft;
   a constraint compatibility module for dynamically determining constraints on aircraft operation in response to the aircraft mode.

2. The control system of claim 1 wherein:
   the aircraft mode includes multiple sub-modes, each sub-mode identifying unique constraints and objectives for the model predictive control module.

3. The control system of claim 1 wherein:
   the active operating mode module identifies the aircraft mode based on a mode/sub-mode selection command.

4. The control system of claim 1 further comprising:
   a constraint selection and prioritization module for dynamically prioritizing the constraints in order of importance.

5. The control system of claim 1 wherein:
   the constraint compatibility module parses constraints dynamically using predetermined compatibility criteria to make binary selections between competing constraints.

6. The control system of claim 1 wherein:
   a constraint selection and prioritization module divides the constraints into hard and soft constraints, wherein hard constraints are constraints which cannot be relaxed.

7. The control system of claim 6 wherein:
   each soft constraint is assigned a priority to determine an amount by which a soft constraint is relaxed relative to other constraints, the constraint selection and prioritization module providing the constraints to the model predictive control module.

8. The control system of claim 1 further comprising:
   an objective selection module for dynamically translating the operator commands into predetermined objectives and prioritizing the objectives in order of importance.

9. The control system of claim 8 wherein:
   the objective selection module prioritizes objectives using finite-state logic and variable weightings.

10. The control system of claim 1 wherein:
    the model predictive control module outputs the limited operator commands as inputs to model-based feed forward and feedback control.

11. The control system of claim 1 wherein:
    the dynamic inversion module receives model predictive control module limited operator commands and provides dynamic control allocation to redundant effectors for the reconfigurable element.

* * * * *